United States Patent [19]

Formenti

[11] 4,086,165
[45] Apr. 25, 1978

[54] LIQUID-TREATMENT SYSTEM

[76] Inventor: Augusto Formenti, P.O. Box 4102, Johannesburg, South Africa

[21] Appl. No.: 748,772

[22] Filed: Dec. 8, 1976

Related U.S. Application Data

[63] Continuation-in-part of Ser. No. 491,874, Jul. 25, 1974, abandoned.

[51] Int. Cl.² .......................... B01D 29/36; C02B 1/16
[52] U.S. Cl. .................................... 210/104; 210/125; 210/128
[58] Field of Search ............... 210/104, 108, 125, 128, 210/266, 429–431

[56] References Cited

U.S. PATENT DOCUMENTS

| | | | |
|---|---|---|---|
| 582,405 | 5/1897 | Stifel | 210/128 X |
| 1,625,197 | 4/1927 | Eisenhauer | 210/128 X |
| 2,751,930 | 6/1966 | Redner | 210/429 |
| 3,616,912 | 11/1971 | Bruton | 210/104 X |
| 3,679,053 | 7/1972 | Kourovatos | 210/104 X |
| 3,695,449 | 10/1972 | Scaglione | 210/429 |
| 3,741,390 | 6/1973 | Wallace et al. | 210/108 X |
| 3,799,344 | 3/1974 | Nishizawa | 210/125 X |

*Primary Examiner*—John Adee
*Attorney, Agent, or Firm*—Robert E. Burns; Emmanuel J. Lobato; Bruce L. Adams

[57] ABSTRACT

A modular liquid-treatment system for treating water having a liquid-treating tank with a liquid-treatment cartridge therein for treating untreated water and a similar storage tank which receives the treated water and stores it for supply on demand. The detection of variation of the water level of the storage tank below a predetermined level is used to automatically control supply of untreated water to the liquid-treating tank. A modular liquid-flow control unit is removably mounted on the two alike tanks. The unit has two similar symmetrically mounted couplings each removably mounted on a corresponding one of the tanks. A supply valve on the unit controls supply of water from an untreated water supply main and supplies the untreated water to a flow-control device which maintains the flow substantially constant in the presence of pressure variations in the supply main. This device precludes water-hammering in the system and keeps the flow within the pressure tolerances of the system so that the tanks and many elements can be made of relatively light plastic. A pair of electromagnetic valves which are closed when de-energized are disposed on the modular coupling on the liquid-treating tank. The electromagnetic valves are energized to open them by application of an electrical signal applied when the level of treated water is detected to be below the predetermined level. Outflow of treated water from the storage tank is automatically controlled by detecting when the treated water level exceeds a predetermined level. The storage tank is vented to allow entry of filtered air and venting of air to the atmosphere as the water level therein varies and avoids contact with the atmosphere.

8 Claims, 3 Drawing Figures

LIQUID-TREATMENT SYSTEM

BACKGROUND OF THE INVENTION

The present application is a continuation-in-part application of my pending application Ser. No. 491,874, filed July 25, 1974 now abandoned.

The present invention relates generally to treatment of liquids, and more particularly, to an apparatus for treating and supplying liquids after treatment and particularly for treating and supplying treated water.

The treatment of water and other liquids for preparation of drinking water, or water or other liquids to be used for preparation of drinks is well known. The known treatment apparatus generally require complex components which are rather complex to assemble. Furthermore, the assembled elements are generally not modular elements which can be assembled in a minimum of space and generally, excessive space is required. Since the elements are not constructed as modular elements, special connections are required, increasing the cost of manufacture and installation.

Since the elements are not made with a modular system in mind, they generally require adaptation to the particular installation.

The known liquid-treatment assemblies have drawbacks in operation in that provision is not generally made for maintaining a constant liquid flow, so that as a consequence, flows in excess of a capacity of the treating units result when pressure variations occur in the supply means providing the untreated liquid. Furthermore, in the treatment of water the tanks for example, sometimes permit contamination of the water, since they are constantly in contact with the atmosphere which allows entry of impurities thereinto. Moreover, the apparatus generally are made specific for a particular type of operation and do not permit easy variation of elements within the assembly such as change of tanks with different liquid-treating cartridges therein when required to change the chemical-physical characteristics of the liquid being treated.

SUMMARY OF THE PRESENT INVENTION

It is an object of the present invention to provide a modular liquid-treatment system which obviates the above-mentioned drawbacks of the prior art.

It is another object to provide a modular construction of a water-treatment system which is compact, which includes modular elements that can be easily assembled and changed or replaced, including the substitution of liquid-treatment cartridges or tanks themselves.

Still another object is to provide a flow control unit in the system by which supply and demand of treated and untreated water can be readily and accurately controlled in dependence upon the demand made for treated water.

Another object of the present invention is to provide a liquid-treatment system in which flow control is maintained substantially constant regardless of pressure variations in the supply of the liquid and to avoid excessive pressure in the system.

Another object of the present invention is the provision of water or a liquid which has been treated and is maintained in its optimum treated condition by elimination of direct contact with the atmosphere.

The liquid-treatment or water-treatment system, made according to the invention, comprises a first tank within which a treating cartridge is contained for treating a liquid such as water. A second tank is provided, constructed similarly to the first tank, but without a cartridge, for receiving the treated liquid from the first tank. A modular liquid-control unit is provided for controlling the flow of the liquid into the first tank to be treated and the flow of the liquid from the first tank to the second tank and outflow of the treated liquid. This unit comprises two similar modular couplings symmetrically mounted and removably connected to the interior of the corresponding one of the two tanks. A mounting element in the unit mounts these couplings with other elements thereon, for mounting and removal thereof as an assembly.

Each modular coupling has two independent coaxial flow paths comprising an inner flow path and an outer flow path. A removable connecting conduit within the unit connects the outer flow path of the modular couplings and a supply valve which is connected in use to a supply main controls the delivery of water to the system through a flow-control device downstream thereof which maintains a substantially constant flow of a pressure tolerable by the liquid-treatment system regardless of the presence of pressure variations in the supply main. This device precludes water-hammering in the system. A pair of electromagnetically-controlled valves, closed when de-energized, are mounted on the unit upstream of the modular coupling of the first tank and downstream of the flow-control device. These valves are opened by application of an electrical signal developed upon detection of the water level within the storage tank being below a predetermined level. This water level is sensed by sensing means that closes a microswitch for application of the signal. Outflow of liquid from the second or storage tank is through the inner flow path of the modular coupling thereon. Outflow can be controlled by sensing the water level in the storage tank and operating a switch that prevents application of a suction to the storage tank when the level falls below a predetermined minimum level.

Provision is made for the entry of filtered air into the tank as the water level varies in the storage tank. Air is vented to the atmosphere as the pressure and level of water in the storage tank changes.

BRIEF DESCRIPTION OF DRAWINGS

Other objects and advantages will appear from the following description of an example of the invention, and the novel features will be particularly pointed out in the appended claims and drawings in which:

DESCRIPTION OF THE PREFERRED EMBODIMENTS

Figure 1:
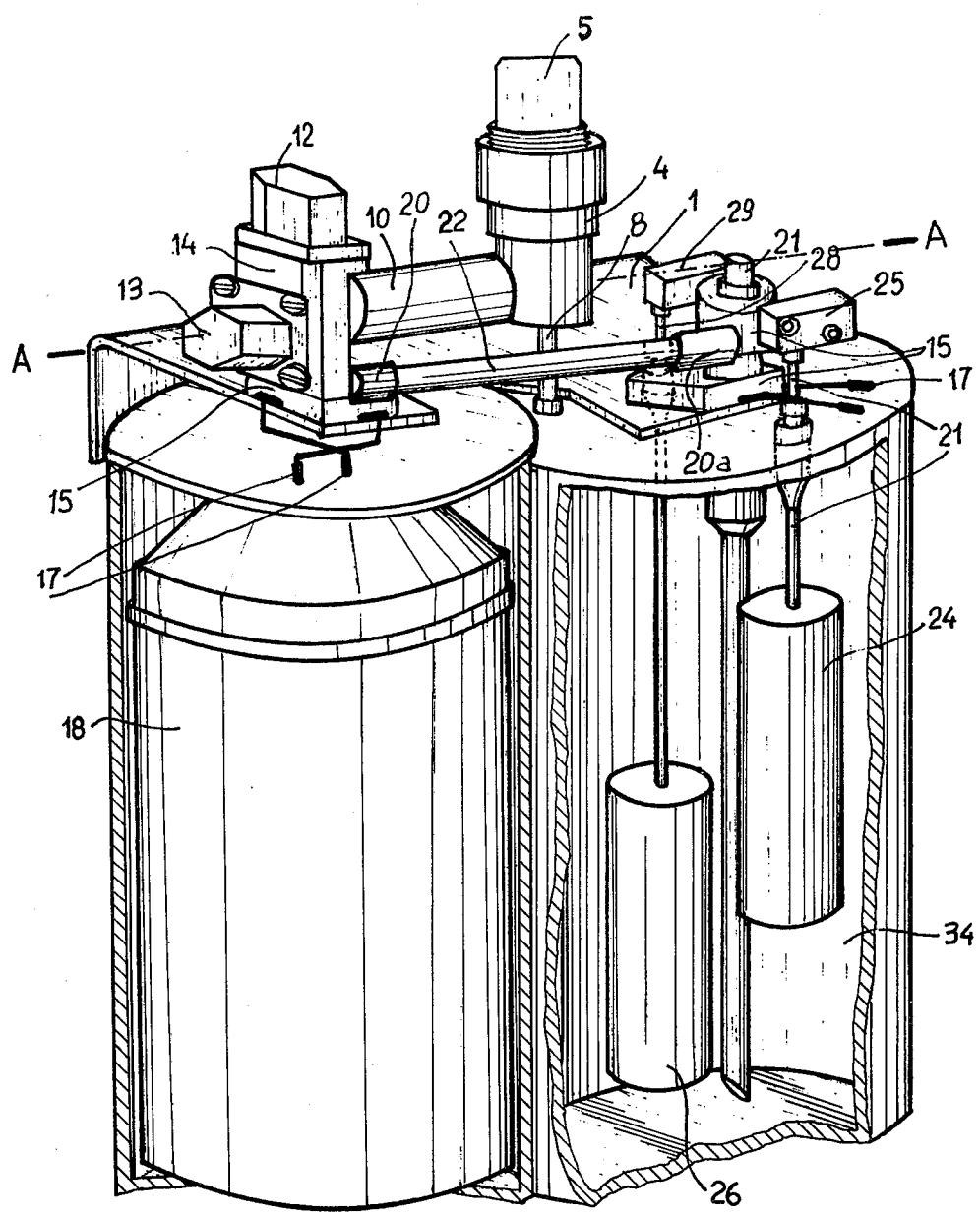
FIG. 1 is an elevation perspective view with a cutaway illustrating the liquid-treatment system according to the invention.
Figure 2:
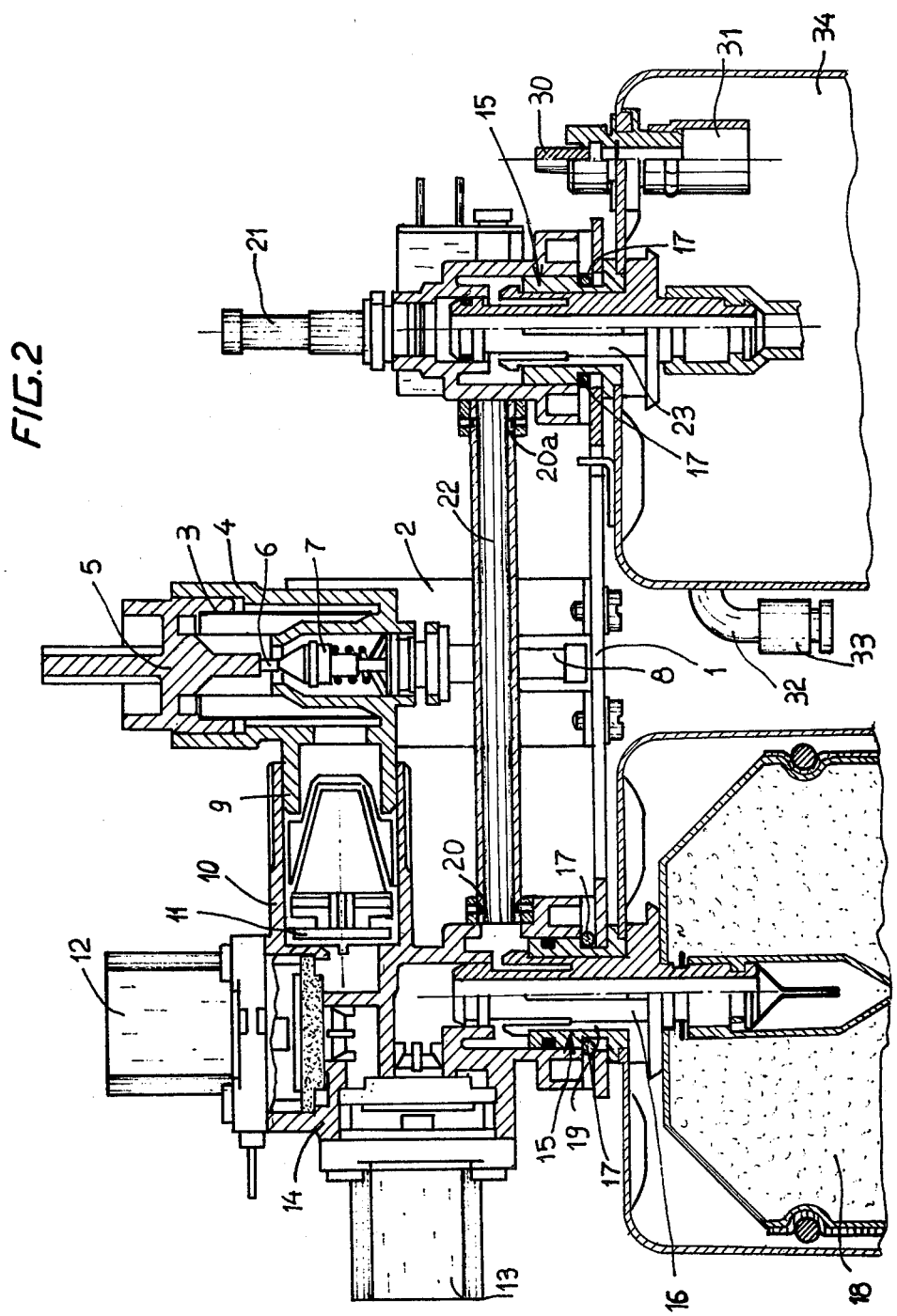
FIG. 2 is a sectional view taken along section line A — A of FIG. 1.
Figure 3:
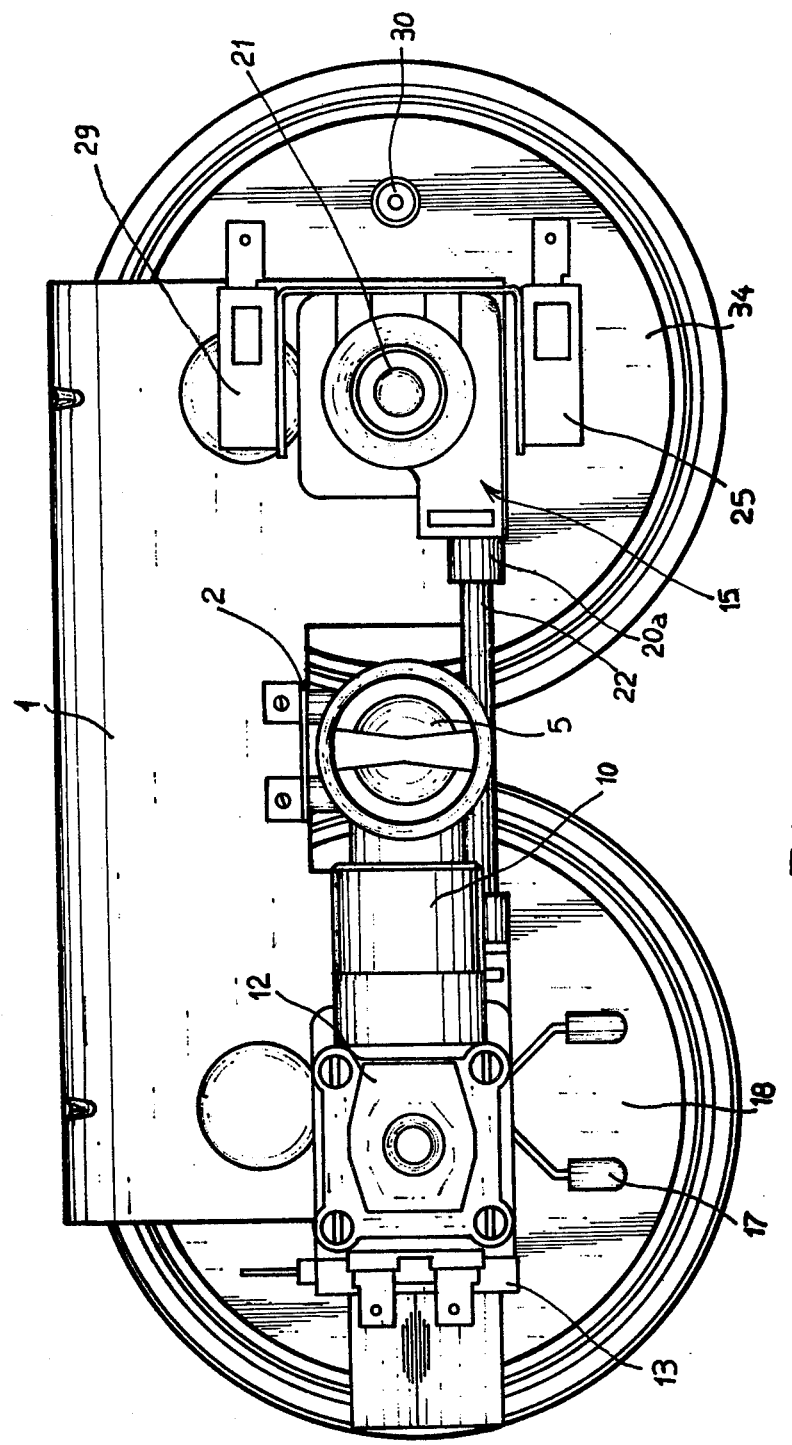
FIG. 3 is a plan view of the system in FIG. 1.

The liquid-treatment system according to the invention is illustrated in the drawings and comprises a flow-control unit having a support or mounting element 1 on which are mounted a plurality of modular elements in fixed relationship to each other so that the unit can be mounted and removed as an assembly. An upstanding bracket 2 fixed on the mounting element supports a normally closed supply valve 4 having internally therein a screen 3 and having a depressable manual button or actuator 5 provided with a projection 6 for applying a pressure to a spring-biased valve element 7 for opening the supply valve. The supply valve is connected in use to a water supply main, or another source of a liquid to be treated, through a connection 8. The manually-operated supply valve 4 has an outlet 9 received axially within a flow-control device 10 and coupled thereto for delivery of the treated water. The flow-control device 10 has therein structure 11 of known construction for maintaining the flow of water substantially constant in the presence of pressure variations within the supply main of water connected to the connection 8. The flow-control device precludes water-hammering and maintains the flow so that a tolerable pressure by the apparatus is possible since the elements of the system may be made primarily of plastic. The flow-control device is connected to electromagnetic valves or electrovalves 12, 13 mounted in a body 14 having therein valve elements in series in the flow path of the water. These two valves are normally closed and are automatically opened to allow water flow therethrough by application of an electrical signal as hereinafter explained in dependence upon the demands of treated water.

The flow-control unit is provided with two symmetrically disposed similarly-constructed modular couplings 15, 15' held in relatively fixed positions by the support element 1. The two modular couplings 15, 15' provide through a corresponding coupling element 16, 23 connection of the flow-control unit to the remainder of the apparatus as later explained. The modular couplings are each provided with grooves circumferentially thereof which receive wire clips 17 for a quickly removably mount. The modular coupling elements 16, 23 have an inner axial flow path for providing water into a water-treating tank 18 having a water-treating cartridge therein and treated water to a treated-water storage tank 34. The cartridge could also be removable through a removable bottom of the tank 18, not shown. The cartirdge is replaceable by a similar type cartridge or a different type. Water-treatment cartridges filled with carbon will remove odors and tastable matter from water. Cartridges with resin reduce hardness of water and carbon-polyphosphate remove tastable matter and reduce hardness. An outer flow path 19, of the modular coupling of the water-treating tank, coaxial with the inner flow path, allows the treated water to flow upwardly through couplings 20, 20a to which is connected a tube 22 for flow of water through the inner element 23 of the modular coupling onto the treated-water storage tank 34.

The modular coupling on the treated-water storage tank is provided with an outlet 21 from which water is removed or taken, for example by a pump, not shown. Within the treated-water storage tank 34 is mounted a float 26 that senses the variations of the level of the treated water within the treated-water storage tank above a predetermined level and it actuates a microswitch 29 through a connection rod 28 which allows application of an electrical signal to control the pump, not shown, for withdrawing or outflow of water through the connection 21. Of course, a suction on the treated-water tank can be taken as the demand therefor exists.

A second float 24 within the treated-water storage tank senses the water level within the storage tank and when it drops below a predetermined level, it actuates, through a connection rod 27, a microswitch 25 which allows application of an electrical signal to the electromagnetic valves 12, 13 to open them for allowing untreated water to enter the water-treating tank 18.

A vent 30 is provided with a one-way valve 31 and a filter for allowing the entry of air into the treated-water storage tank 34 as the water level drops. An overflow discharge connection 32 provided with a one-way valve 33 is provided at an upper part of the storage tank 34, for venting the upper part to the atmosphere for allowing venting of air as the water level changes and acting as an overflow if necessary.

What I claim is:

1. A liquid-treatment system made of modular elements for treating liquids such as water comprising; a first tank having a liquid-treatment cartridge therein for treating all of a liquid received for treatment; a second tank constructed similarly to the first tank without a cartridge for receiving the liquid treated in said first tank; a modular liquid-control unit for controlling flow of liquid into said first tank to be treated and flow of liquid from said first tank to said second tank and outflow of treated liquid from said second tank comprising, two similar modular couplings symmetrically mounted and each removably connected to the interior of a corresponding one of said first tank and said second tank, a mounting element fixedly mounting said modular couplings relative to each other thereon for mounting and for removal of said liquid-control unit as an assembly with respect to the two tanks, mounting elements on said modular couplings for mounting thereof removably on the corresponding tanks, each modular coupling having two independent coaxial flow paths comprising an inner and an outer flow path, a removable connecting conduit connecting the outer flow paths of the modular couplings, a supply valve mounted on said mounting element connectable in use to a supply main for supplying liquid to be treated and having a valve element for turning on and off flow of liquid into said liquid-control unit, a flow-control device in series with said supply valve for controlling the flow of liquid from said supply valve at a substantially constant flow at a pressure tolerable by the liquid-treatment system in the presence of pressure variations in the supply main and for precluding water-hammering in the system, at least one electromagnetically-controlled valve closed when deenergized mounted on and upstream of the modular coupling mounted on said first tank and downstream of said flow-control device for supply of liquid therethrough to the inner flow path of said modular coupling on said first tank for flow through said liquid-treatment cartridge, a pair of similar microswitches on said fluid-control unit comprising a first microswitch for controlling application of an electrical signal to said electromagnetically-controlled valve for opening for allowing flow of liquid into said first tank in dependence upon the water level in said second tank to render said first microswitch effective to apply said signal when said liquid in said second tank is below said predetermined level; means for rendering the second of said microswitches effective to control the outflow of liquid from said second tank through the inner flow path of said second modular coupling; said second tank having one-way means above said predetermined level for venting it to the atmosphere; and one-way means on said second tank for allowing entry of filtered air thereinto as the level of said second tank varies downwardly.

2. A liquid-treatment system made of modular elements for treating liquids such as water according to claim 1, including a second electromagnetically-controlled valve controlled by said signal mounted on the modular coupling on said first tank downstream of the first-mentioned electromagnetically-controlled valve and upstream of the modular coupling on said first tank.

3. A liquid-treatment system made of modular elements for treating liquids such as water according to claim 1, in which said means for rendering said second microswitch effective comprises second sensing means for sensing the level of the liquid in said tank and to render said second microswitch effective when a maximum predetermined level is exceeded.

4. A liquid-treatment system made of modular elements for treating liquids such as water according to claim 1, in which said tanks are made of plastic.

5. A liquid-treatment system made of modular elements for treating liquids such as water according to claim 4, in which said first and second modular couplings are made of plastic.

6. A liquid-treatment system made of modular elements for treating liquids such as water and the like according to claim 1, in which said supply valve comprises a manually-operated valve element.

7. A liquid-treatment system made of modular elements for treating liquids such as water and the like comprising; two alike plastic tanks of similar capacity; a liquid-treatment cartridge in one of said tanks for treating all the liquid received therein; a modular-liquid control unit comprising, a pair of similar modular couplings each removably connected with the interior of a corresponding one of said two tanks, each modular coupling having two independent flow paths internally thereof, mounting means for mounting said modular couplings relative to each other for removably mounting on and removal from said two tanks as an assembly of said unit, a supply valve on said unit connectable in use to a supply main for supply of a liquid to be treated and for turning on and off supply of said liquid from said supply main, flow-control means on said unit downstream of said supply valve for controlling the flow of said liquid to maintain it substantially constant in the presence of pressure variations in said supply main to preclude water-hammering in said system, an electromagnetic valve closed when de-energized and mounted on one of said modular couplings on said one tank between said one modular coupling in series with one of the flow paths thereof and said flow-control device for control of flow of liquid into said one tank in dependence upon the liquid in the other of said two tanks being below a predetermined level, conduit means removable in said unit for providing communication between the other of the flow paths of said one modular coupling and one of the flow paths of the other modular coupling on the other of said two tanks; means including automatic sensing means for sensing level variations of the liquid in said other tank; means for automatically applying an electrical signal to said electro-magnetic valve to open it when said sensing means detects the level of said liquid falls below a predetermined level; means for automatically controlling the outflow of liquid from said other tank through the other flow path of said other modular coupling in dependence upon automatic detection of the level of the liquid in said other tank exceeding a predetermined level; one-way venting means for filtering air and allowing it to enter into said other tank as the level of the liquid therein drops; and one-way overflow and venting means above the level of said predetermined level on said other tank for allowing venting of air therethrough.

8. A liquid-treatment system made of modular elements for treating liquids such as water and the like according to claim 7, including another electromagnetic valve on said one modular coupling controlled simultaneously with the first-mentioned electromagnetic valve and in the same flow path as said first-mentioned electromagnetic valve upstream of said one modular coupling.

* * * * *